INVENTOR.
John H. Little
BY J. W. Lovett
ATTORNEY

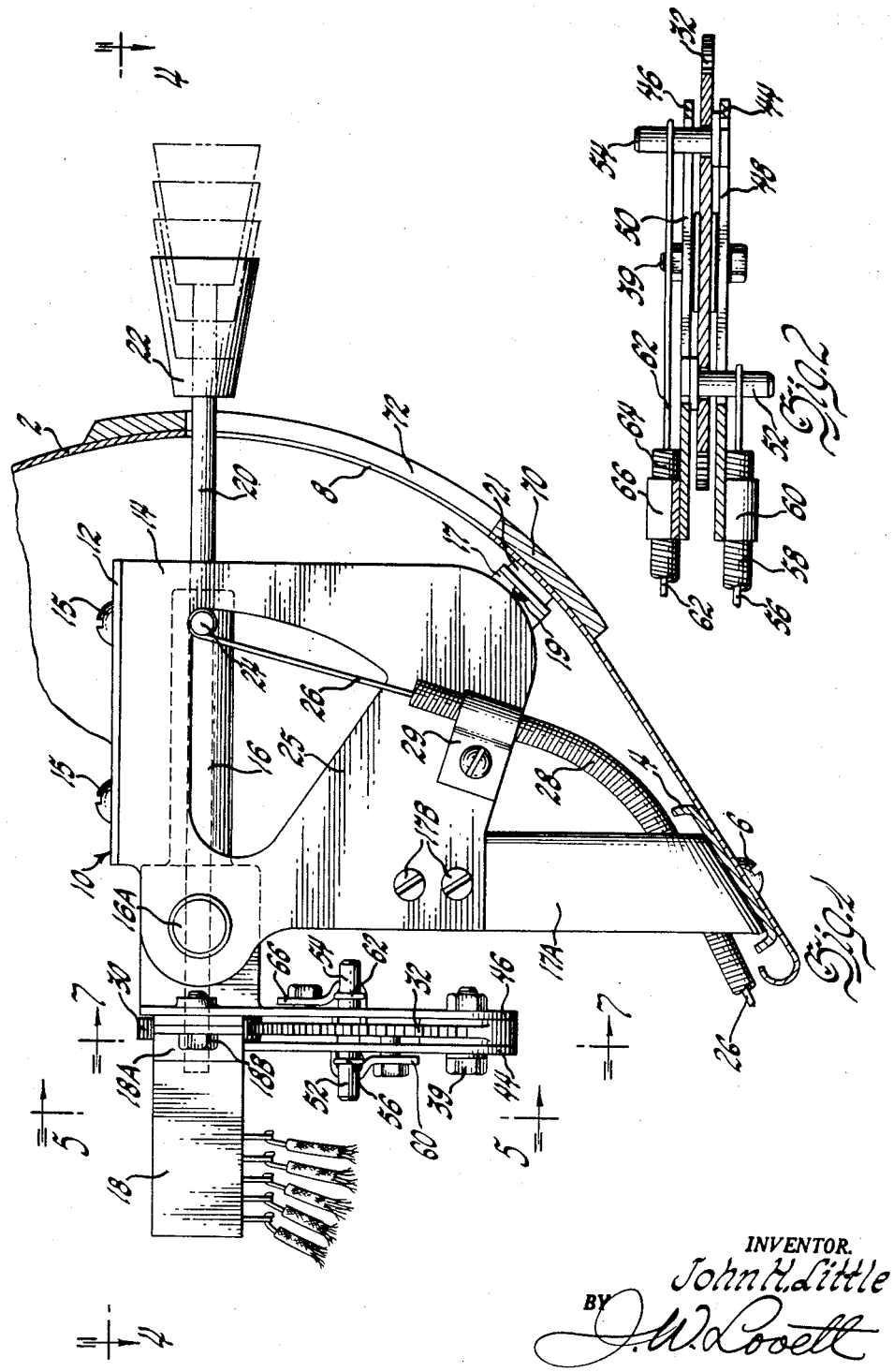

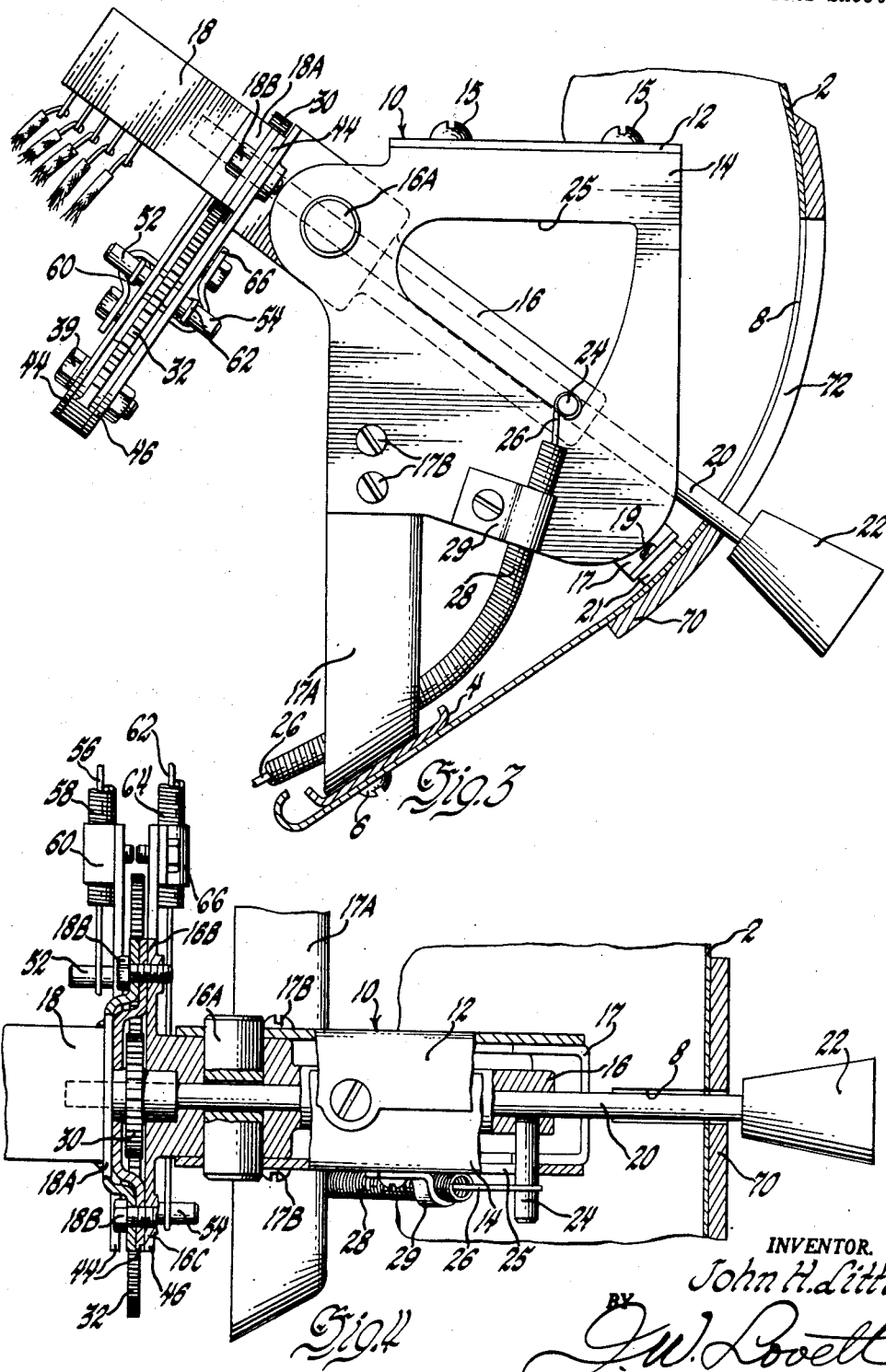

United States Patent Office 2,912,873
Patented Nov. 17, 1959

2,912,873

MULTIPLE MOVEMENT CONTROL UNIT

John H. Little, Huntington Woods, Mich., assignor to General Motors Corporation, Detroit, Mich., a corporation of Delaware Application November 19, 1956, Serial No. 623,171

4 Claims. (Cl. 74—471)

This invention relates to control apparatus and more particularly to control units for selectively operating or adjusting multiple elements such as switches and valves.

The present invention is particularly useful in association with heating, ventilating and air conditioning systems of automobiles which employ switches for multiple speed blowers and valves controlling the passage of air and liquids through suitable ducts and conduits. The invention is not limited to such use as obviously it could be employed in actuating or adjusting control elements on electronic apparatus or in other fields.

When multiple elements in an automotive heating system, for example, are to be selectively manipulated it is clear that a single or unitary control lever or knob would be advantageous and convenient in operating them. It is also evident that compactness, simplicity and low cost are important factors which should characterize the control unit.

An object of the present invention is to provide an improved control unit for adjusting multiple elements selectively.

A feature of the invention is a pivoted lever which is movable longitudinally, rotatable on its own axis and swingable on an axis transverse thereto.

The above and other important features of the invention will now be described in detail in the specification and then pointed out more particularly in the appended claims.

In the drawings:

Fig. 1 is a side elevational view of a control device as installed on an automotive instrument panel;

Fig. 2 is a sectional view taken along the line 2—2 in Fig. 5;

Fig. 3 is a view similar to that of Fig. 1 but with the control device differently adjusted;

Fig. 4 is a view of the device shown in Fig. 1 with portions taken in section looking in the direction of the arrows 4—4 in Fig. 1;

Figure 5:
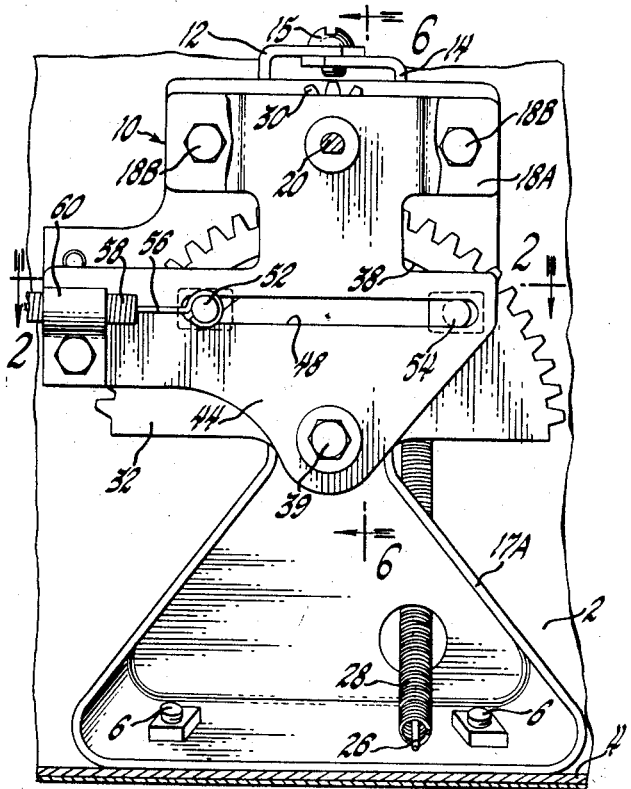
Fig. 5 is a view of the device of Fig. 1 looking in the direction of the arrows 5—5 in Fig. 1.
Figure 6:
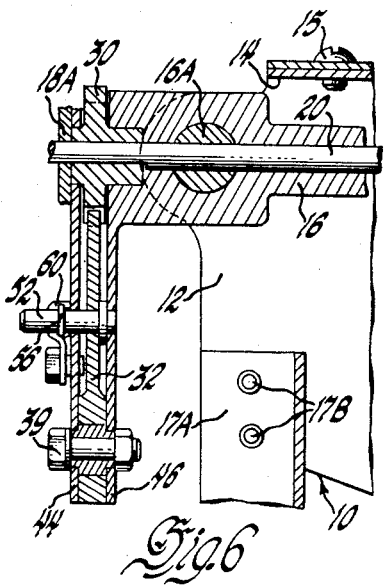
Fig. 6 is a sectional view taken along the line 6—6 of Fig. 5.

In the drawings, the control device is shown as associated with an automobile instrument panel 2 which is reinforced by a horizontally extending U-shaped strip 4 fastened to the panel by means of bolts 6. The panel 2 lies in a plane which is upwardly curved and bears a vertically extending slot 8.

Concealed from view by the instrument panel 2 is a frame generally indicated at 10 and which comprises two side plates 12 and 14 which overlap at the top and are joined together by means of screws 15. Bottom portions of the side plates 12 and 14 are joined together by a U-shaped member 17 which in turn is fixed to the panel 2 by means of a screw 19. A compressible washer 21 is interposed between the member 17 and the panel.

A triangular frame member 17A, best disclosed in Fig. 5, is fixed to the panel 2 and the reinforcing strip 4 by the bolts 6 and to the side plates 12 and 14 by screws 17B.

A guide member 16 of elongated configuration is journaled on a pin 16A transverse thereto and supported by the two plates 14 and 12. One end of the guide member 16 bears an integral plate having opposed portions 16B and 16C (Fig. 4) to which a supporting plate 18A for control element or switch 18 is attached by means of screws 18B. This switch is of a conventional type that can be operated to select one or more circuits for operating a device such as a blower motor at selected speeds.

A rod 20 is slidably mounted within the guide member 16 and has one end extending through the panel slot 8 to carry a manipulative knob 22. The rod passes through the pin 16A and extends into the switch 18 for effecting selection of the proper contacts by sliding movement of the rod.

The end portion of the guide member 16 which extends toward the panel 2 carries a pin 24 which extends out through an opening 25 in the side plate 14. A Bowden wire 26 is fixed to the pin 24 and is slidably encased in a conduit 28 anchored to the plate 14 by a clamp 29.

Figure 7:
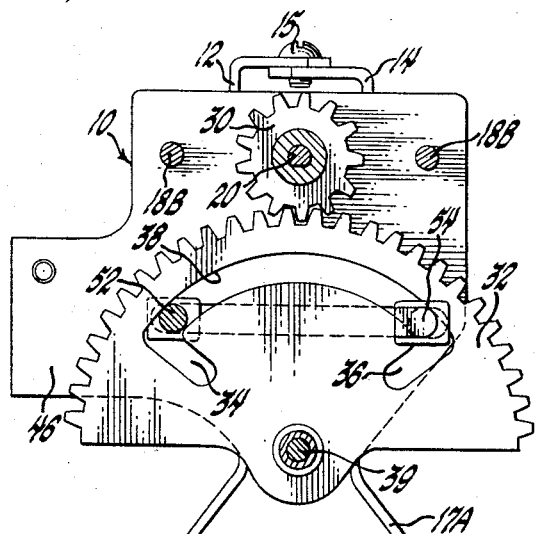
Fig. 7 is a sectional view taken along the line 7—7 of Fig. 1.
Figure 8:
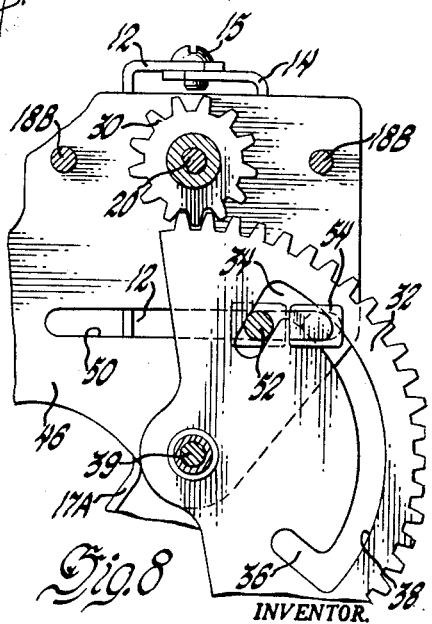
Fig. 8 is a view similar to Fig. 7, but with the parts in different relative positions.

A pinion gear 30 is non-rotatably held on the rod 20 and is in slidable relation therewith. This pinion gear is meshed with gear means constituting a second gear or gear segment 32. The gear means is best seen in Figs. 7 and 8 and is formed with two short radial slots 34 and 36 connected by an arcuate slot 38. The gear segment is pivoted on a bolt 39 passing through two parallel plates 44 and 46. The plate 44 is held to the plate 46 which is integral with the guide member 16 by the screws 18A. The plates 44 and 46 are provided with horizontal guide slots 48 and 50 which are aligned to receive oppositely directed pins 52 and 54. These pins bear flanges each of which is adapted to slide between the gear 32 and a plate 44 or 46. A Bowden wire 56 is joined to the pin 52 and this wire is guided by a conduit 58, one end of which is held by means of a clamp 60 to the plate 44. Another Bowden wire 62 has one end joined to the pin 54 and this wire is protected by a conduit 64 held to the plate 46 by a clamp 66.

It will be noted that the panel 2 for a major portion of its vertical width has a curvature coaxial with the pin 16A so that, upon vertical up or down movement of the knob 22, a uniform clearance exists between the panel and the knob. An escutcheon plate 70 bearing a slot 72 in registry with the slot 8 is provided to make the arrangement more attractive in appearance, and this escutcheon plate is suitable for bearing proper legends showing the functions of the heating system to be gained by adjusting the knob 22 along the length of the slot 72.

As indicated by dot-and-dash lines in Fig. 1, the knob 22 may be moved longitudinally into several positions and thereby actuate the switch 18 to secure a selected operation of the switch 18.

With a vertical and downward swinging motion of the knob 22, the Bowden wire 26 may be caused to operate some valve in the system. Rotation of the rod 20 on its own axis has no effect on the Bowden wire 26 as the pin 24 is fixed to the guide member 16.

With rotation of the knob 22 and the rod 20 on their own axes the pinion 30 will be rotated and thereby cause rotation of the pinion gear 30 and the gear segment 32. With this rotation of the gear segment, either the pin 52 or the pin 54 will be moved from an extreme end position in the slots 48 and 50. Assuming that the pin 52 is positioned as shown in Figs. 2 and 7, the knob 22 is then rotated in such direction as to cause the gear segment 32 to move in a clockwise direction, as viewed in Fig. 7. With such rotation of the segment 32, the radial slot 34 will receive the pin 54 and the radial wall will cause the pin 52 to slide along the slots 48 and 50 to the position shown in Fig. 8. This will cause a pull on the Bowden wire 56, but the Bowden wire 62 will not be moved as the pin 54 will not be actuated by the segment 32, the slot 38 being concentric with the pin 39.

If the knob 22 were so rotated as to move the segment 32 in a counterclockwise direction from its position as shown in Fig. 8, the pin 52 will be urged back to its original position, as seen in Fig. 7, and the pin 54 will not be moved until the radial slot 36 receives it. If the segment 32 is moved to a position beyond that shown in Fig. 7, the pin 54 will be moved to the left with actuation of the Bowden wire 62 and without disturbing the position of the Bowden wire 56.

From this description it may be seen that a single control element or knob is utilized selectively to adjust multiple devices such as the switch 18 and valves or other units to which the Bowden wires 26, 56 and 62 are connected.

I claim:

1. A control unit including a frame, a guide member pivotally mounted on said frame, a control device for actuating at least one other device and fixed to one end of said guide member to move therewith, a rod longitudinally slidable in said guide member and extending from the other end thereof for actuation by an operator, said rod engaging said control device for operating the same, a pin for actuating another device and fixed to said guide member to move therewith, a pinion gear arranged to slide along the length of said rod and nonrotatively fixed thereto to rotate therewith, a second gear meshing with said pinion gear and formed with two substantially radial slots connected by an arcuate slot, two parallel plates fixed to said guide member and pivotally supporting said second gear between them, each of said plates having a guide slot, and a pin for actuating another separate device and fixed to slide in the guide slot of each of said plates and one of said second gear slots.

2. A control unit including a frame, a guide member pivotally mounted on said frame, a control device fixed to one end of said guide member to swing therewith, a rod longitudinally slidable in said guide member and extending from the other end thereof, said rod engaging said control device for operating the same, a pinion gear slidably fixed to said rod to be rotated thereby, a second gear meshing with said pinion gear and formed with substantially radial slots joined by an arcuate slot, two plates fixed to said guide member and pivotally supporting said second gear between them, each of said side plates having a guide slot, and a pin for controlling a separate device and fixed to slide along and in the guide slot of each one of said plates and a slot of said second gear.

3. A control unit including a frame, a guide member pivotally mounted on said frame, a switch fixed to one end of said guide member to move therewith, an instrument panel having an escutcheon plate and supporting and concealing said frame, a rod longitudinally slidable in said guide member and having one end extending through registering slots in said panel and escutcheon plate, the other end of said rod entering said switch for controlling the same, means fixed to said guide member for operating a separate device upon pivotal movement of said rod, a pinion gear arranged to be rotated by said rod and slidable thereon, a second gear meshing with said pinion gear and formed with radial slots connected by an arcuate slot, two plates fixed to said guide member and pivotally supporting said second gear, each of said plates having a guide slot, and a pin fixed to slide in the guide slot of each of said plates and a slot of said second gear for actuating another separate device upon rotation of said rod.

4. A unit for controlling multiple devices including a frame, a curved instrument panel supporting and concealing said frame, a guide member pivotally mounted in said frame for arcuate movement substantially conforming with the curved contour of said panel, a switch for controlling at least one of said devices and fixed to one end of said guide member for bodily movement therewith behind said panel, a rotatable rod longitudinally slidable in said guide member with one end operatively connected to said switch and the other end extending forwardly through an opening in said panel for manual manipulation, a pinion gear slidable on said rod and fixed thereto for rotation therewith, gear means meshing with said pinion gear and having two substantially radial slots connected by an arcuate slot, two parallel plates fixed to said guide member and pivotally supporting said gear means between them, each of said plates having a guide slot, and a pin for controlling another of said devices and fixed to slide along the guide slot of each of said plates and one of said gear means slots.

References Cited in the file of this patent

UNITED STATES PATENTS

| | | |
|---|---|---|
| 621,193 | Wilson | Mar. 14, 1899 |
| 1,471,497 | Martin | Oct. 23, 1923 |
| 1,805,375 | Sampson | May 12, 1931 |
| 1,861,511 | Russell | June 7, 1932 |
| 2,289,654 | Keel et al. | July 14, 1942 |
| 2,460,374 | Walls | Feb. 1, 1949 |
| 2,524,459 | McCoy | Oct. 3, 1950 |